US009525629B2

(12) United States Patent
Che (10) Patent No.: US 9,525,629 B2
(45) Date of Patent: Dec. 20, 2016

(54) METHOD AND APPARATUS FOR TRANSMITTING DATA PACKETS (71) Applicant: Tencent Technology (Shenzhen) Company Limited, Shenzhen (CN)

(72) Inventor: Jiuzhou Che, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 199 days.

(21) Appl. No.: 14/460,260

(22) Filed: Aug. 14, 2014

(65) Prior Publication Data

US 2015/0172091 A1 Jun. 18, 2015

Related U.S. Application Data (63) Continuation of application No. PCT/CN2014/080209, filed on Jun. 18, 2014.

(30) Foreign Application Priority Data

Dec. 13, 2013 (CN) .......................... 2013 1 0689030

(51) Int. Cl.
*H04L 12/747* (2013.01)
*H04L 29/06* (2006.01)

(52) U.S. Cl.
CPC ........... *H04L 45/742* (2013.01); *H04L 69/164* (2013.01); *H04L 69/22* (2013.01)

(58) Field of Classification Search
None
See application file for complete search history.

(56) References Cited

U.S. PATENT DOCUMENTS

2008/0144625 A1* 6/2008 Wu ...................... H04L 12/4641
370/392
2009/0185551 A1* 7/2009 Winter ................... H04L 12/66
370/351

(Continued)

FOREIGN PATENT DOCUMENTS

CN 101127702 A 2/2008
CN 101150763 A 3/2008
WO WO 2012094916 A1 7/2012

OTHER PUBLICATIONS

Tencent Technology, ISRWO, PCT/CN2014/080209, Sep. 19, 2014, 7 pgs.

(Continued)

*Primary Examiner* — Kodzovi Acolatse
(74) *Attorney, Agent, or Firm* — Morgan, Lewis & Bockius LLP (57) ABSTRACT A method of transmitting data packets across a network, comprising: at a first server: receiving a first data packet of a message-based connectionless protocol (e.g., a first UDP data packet); identifying a second server for forwarding the first data packet toward a respective destination of the first data packet; adding a respective packet identifier to the first data packet to generate a first augmented data packet of the message-based connectionless protocol; and sending at least two copies of the first augmented data packet to the second server at substantially the same time. The second server receives at least one of the two copies of the first augmented data packet, restores the first data packet from the received copy of the first augmented data packet, and forwards the first data packet toward the respective destination of the first data packet.

18 Claims, 8 Drawing Sheets

(56) References Cited

U.S. PATENT DOCUMENTS

| | | | |
|---|---|---|---|
| 2009/0252151 A1* | 10/2009 | Rappe | H04L 12/2602 370/352 |
| 2011/0142034 A1* | 6/2011 | Wu | H04N 21/2343 370/352 |
| 2012/0054583 A1* | 3/2012 | Park | H03M 13/3761 714/776 |

OTHER PUBLICATIONS

Tencent Technology, IPRP, PCT/CN2014/080209, Jun. 14, 2016, 5 pgs.

* cited by examiner

| Source port | Target port | Length field | Check sum | header of packet |
|---|---|---|---|---|
| ID | | | | |
| Content of packet | | | | Body of packet |

METHOD AND APPARATUS FOR TRANSMITTING DATA PACKETS

PRIORITY CLAIM AND RELATED APPLICATIONS

This application is a continuation application of PCT Patent Application No. PCT/CN2014/080209, entitled "METHOD AND APPARATUS FOR TRANSMITTING DATA PACKETS" filed on Jun. 18, 2014, which claims priority to Chinese Patent Application No. 201310689030.3, entitled "Method and Apparatus for Transmitting Data Packets", filed on Dec. 13, 2013, both of which are incorporated by reference in their entirety.

TECHNICAL FIELD

The disclosed implementations relate generally to the field of networking technologies, and in particular, to method and apparatus for transmitting data packets.

BACKGROUND

Currently, a message-based connectionless protocol, such as User Datagram Protocol (UDP) is usually used for transmission of data packets of radio and video. The UDP protocol, being a connectionless protocol, has a higher performance for timeliness than the connection-oriented protocols, such as Transmission Control Protocol (TCP). However, in the conventional technique of data packet transmission based on the UDP protocol, there is no assurance that the data packets will reach their destinations, and the packet loss rate is relatively high.

SUMMARY

In the present disclosure, a method and system for transmitting data packets over a network is disclosed.

In some embodiments, a method of transmitting data packets across a network, comprising: at a first server having one or more processors and memory: receiving a first data packet of a message-based connectionless protocol (e.g., a first UDP data packet), the first data packet having a respective destination different from the first server; identifying a second server for forwarding the first data packet toward the respective destination of the first data packet; adding a respective packet identifier to the first data packet to generate a first augmented data packet of the message-based connectionless protocol; and sending at least two copies of the first augmented data packet to the second server at substantially the same time. The second server receives at least one of the two copies of the first augmented data packet, restores the first data packet from the received copy of the first augmented data packet, and forwards the first data packet toward the respective destination of the first data packet.

In some embodiments, a method of transmitting data packets across a network, comprising: at a first server having one or more processors and memory: receiving a second augmented data packet of the message-based connectionless protocol from a third server for a first time, the second augmented data packet comprising a second data packet with a respective packet identifier of the second data packet inserted in a respective content body of the second data packet; restoring the second data packet from the second augmented data packet; caching the respective packet identifier of the second data packet; and forwarding the second data packet toward a respective destination of the second data packet. In some embodiments, the method further includes: receiving the second augmented data packet of the message-based connectionless protocol from the third server for a second time; in response to receiving the second augmented data packet for the second time, removing the cached respective packet identifier for the second data packet; and discarding the second augmented data packet. In some embodiments, the method further includes: determining whether a currently received augmented data packet is a duplicate data packet of a previously received augmented data packet based on whether a respective packet identifier contained in the currently received augmented data packet has been cached at the first server. In some embodiments, the method further includes removing the cached respective packet identifier of the second data packet if the second augmented data packet is not received before expiration of a predetermined life period for the respective packet identifier of the second data packet.

In some embodiments, a device (e.g., a first server, a second server, etc.) includes one or more processors; and memory storing one or more programs for execution by the one or more processors, wherein the one or more programs include instructions for performing the operations of the methods described herein. In some embodiments, a non-transitory computer readable storage medium stores one or more programs, the one or more programs comprising instructions, which, when executed by an electronic device (e.g., a first server, a second server, etc.) each with one or more processors, cause the electronic device to perform the operations of the methods described herein.

In at least some embodiments of the method and system for transmitting data packets disclosed herein, before sending multiple copies (e.g., 2 copies) of the same UDP packet to the second server, the first server first adds a respective ID in the UDP packet to distinguish the UDP packet from other UDP packets already transmitted and/or to be transmitted around the same time (e.g., within 12 hours (e.g., the life time of a packet identifier) of one another), then, sends multiple copies of the UDP packet to the second server. If the packet loss rate is 60% (i.e., 60 UDP packets will be lose in transit out of 100 UDP packets sent), and the number of copies of the UDP packets with same packet identifier (ID) is 2, then, the probability of UDP packet loss during transit corresponding to the ID will be the square of 60%, namely 36%, (which is the probability of losing both copies of the UDP packet). If the number of copies of the UDP packet with same ID is n, then the probability of losing the UDP packet during transit will be $(60\%)^n$. The actual packet loss rate will be lowered by sending multiple copies of the same packet at the same time, because the packet loss rate for a single copy is smaller than 1.

Various other advantages of the various embodiments would be apparent in light of the descriptions below.

BRIEF DESCRIPTION OF DRAWINGS

The aforementioned embodiments as well as additional embodiments will be more clearly understood in light of the following detailed description taken in conjunction with the drawings.

Like reference numerals refer to corresponding parts throughout the several views of the drawings.

DETAILED DESCRIPTION

The present application will be further described in detail by means of embodiments with reference to the drawings, in order to make the technical solution of the present application more clear and understandable. It should be understood that the specific embodiments described here is only for explaining the present application but not for limiting the present application.

Although the terms first, second, etc. may be used herein to describe various elements, these elements should not be limited by these terms. These terms are only used to distinguish one element from another. For example, first server could be termed second server, and, similarly, second server could be termed first server, without departing from the scope of the present application. First server and second server are both servers, but they are not the same server within a common context. A first server and a second server could be the same server if they are referred to within different contexts in the present disclosure.

As set forth above, although a connectionless protocol (e.g., UDP) has the advantage of providing better timeliness performance than a connection-oriented protocol (e.g., PCT), but suffers from a higher packet loss rate. Sometimes, when the packet loss rate is too high, the real-time performance of UDP also suffers. Previously, some techniques have been used to mitigate the packet losses suffered by transmissions using UDP. For example, by reducing the packet size of the UDP data packets and increasing the receiving buffer, the packet loss rate may be reduced. However, this technique focuses on the nature of the data packets themselves, and does not address the in-transit loss of the data packets. Sometimes, TCP is used to replace UDP for unstable networks, but data packets transmitted via TCP takes a longer time to transmit, and each packet loss requires a retransmission which has a bigger impact on user experience. Sometimes, a retransmission mechanism is implemented to retransmit a lost data packet. However, retransmission of a data packet first requires a determination of whether the packet has been lost. The time required to make the determination is long and can be at least the round-trip time for transmitting the data packet. This means, the advantage of UDP over TCP is effectively eliminated.

In the present disclosure, a technique for transmitting data packets of a message-based connectionless protocol (e.g., UDP) over a network is disclosed. A first server maintains the data packet structure required by the connectionless transmission protocol, but augments the data packet by inserting a respective packet identifier into the content body of the data packet. Then, the first server sends multiple copies of the same data packet to a second server at the same time or substantially the same time (e.g., before any determination of whether the data packet has been lost in transit). On the receiving side, the second server may receive one or more of the copies of the same data packet sent by the first server, but only forwards the first received copy of the same data packet. The second server determines whether a currently received data packet is a duplicate of a previously received data packet based on whether the currently received data packet has a respective packet identifier that has already been cached by the second server. If no such packet identifier has been cached, the second server caches the packet identifier and forwards the data packet. If the same packet identifier has been cached, the second server discards the data packet. The second server clears the cached packet identifier when all copies of the data packet have been received, or when a life period of the packet identifier expires after the data packet was received for the first time.

Figure 1:
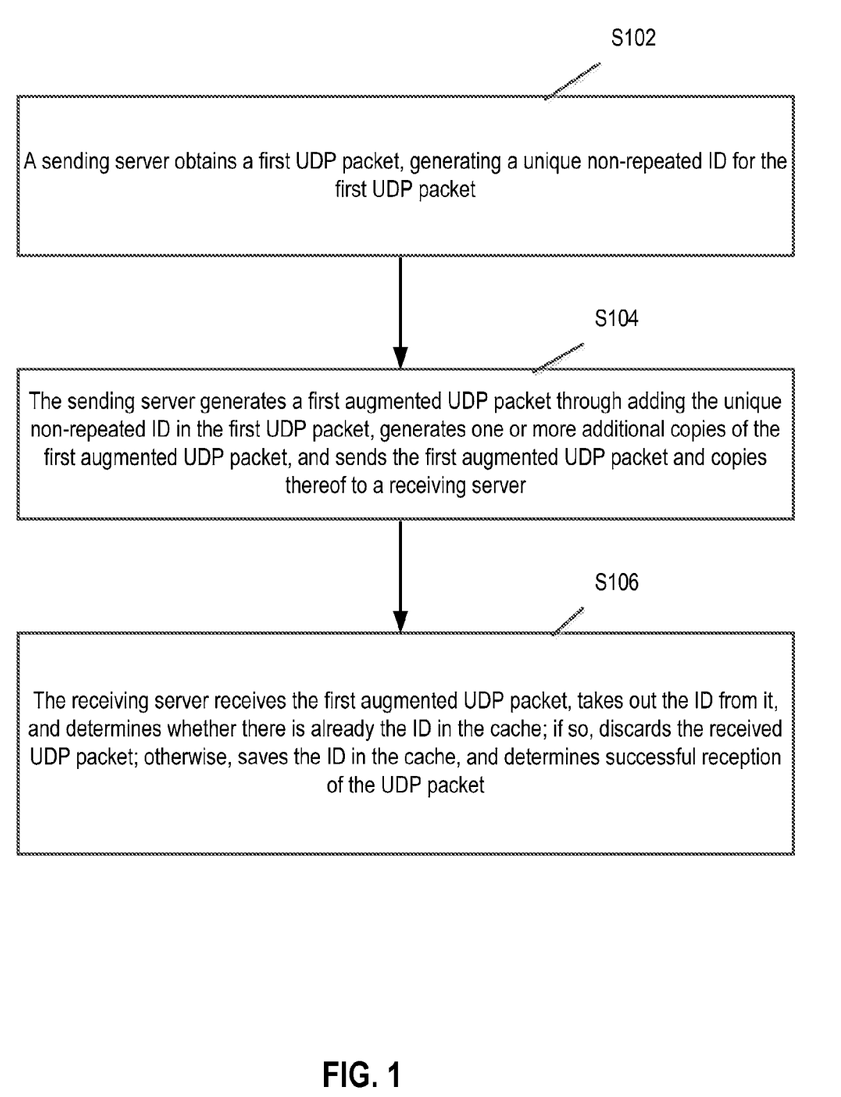
FIG. 1 is a flow chart of a method for transmitting data packets in accordance with some embodiments.
Figure 2:
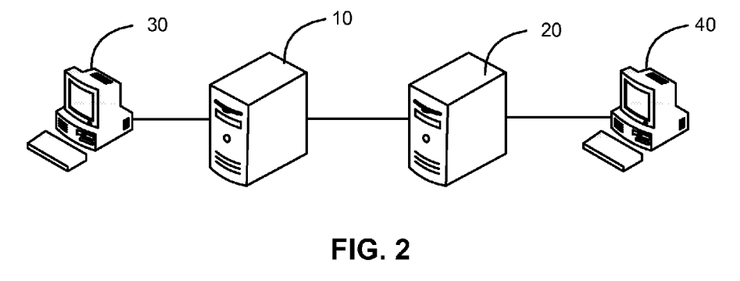
FIG. 2 is a block diagram of a system for transmitting data packets in accordance with some embodiments.

As shown FIG. 1 and FIG. 2, a method for transmitting data packets provided in one embodiment may be used in a communication system, which includes at least a first server 10 and a second server 20, as shown in FIG. 2.

The first server 10 and the second server 20 can be computer devices or gateway devices arranged in a wide area network (WAN), and the data transmission protocol between the first server 10 and the second server includes a message-based connectionless protocol, such as the UDP protocol.

In some embodiments, the method for transmitting data packets from one terminal 30 to another terminal 40 through the first server 10 and the second server 20 includes the following steps:

Step S102: the first server obtains a first UDP packet (e.g., from the terminal 30), and generates a unique non-repeated packet identifier for the first UDP packet. In some embodiments, the unique non-repeated packet identifier is unique and non-repeated for a limited duration (e.g., 12 hours or 20 hours after the previous time that the same packet identifier has been used for another data packet). For practical purposes, the packet identifier is considered a unique non-repeated packet identifier if the servers can easily distinguish the data packets that are sent and received around the same time (e.g., before the servers flushes the cached packet identifiers each time).

Step S104: the first server generates a first augmented UDP packet by adding the unique non-repeated packet identifier in the first UDP packet, generates a copy of the first augmented UDP packet, and sends the first augmented UDP packet and the copy thereof to the second server.

Figure 3:
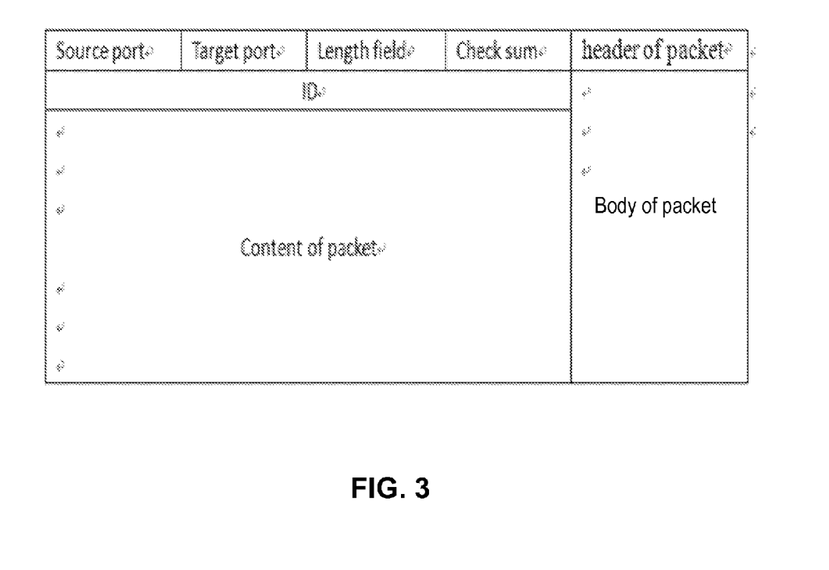
FIG. 3 is a schematic diagram of an exemplary data structure of a UDP packet in accordance with some embodiments.

As shown in FIG. 3, in some embodiments, the generated unique non-repeated packet identifier is added in the body of the UDP packet by the first server, that means the added packet identifier is separated and independent of the UDP protocol header of the UDP packet, but belongs to the packet content of the UDP packet. Network devices (such as routers, bridges, switches, etc.) for forwarding the data packet in the WAN do not have influence to the first augmented UDP packet because the packet identifier is added in the body of the first UDP packet. To the intermediate network devices between the first and the second servers, the first augmented data packet looks like a normal data packet, and no special processing needs to be performed on the first augmented data packet before it is forward toward the destination (e.g., reaching the second server before reaching the destination terminal). In some embodiments, the first server 10 is the closest server connected to the sending terminal 30, and the second server 20 is the closest server connected to the receiving terminal 40.

In some embodiments, the first augmented UDP packet is a UDP packet in which a packet identifier is added, where the packet identifier is a unique non-repeated ID for the first data packet. In some embodiments, the first augmented UDP packet is a preset fixed repeatable identifier. Described below is a UDP packet in which a preset fixed repeatable ID is added.

In one embodiment, the step of generating a unique non-repeated ID by the first server further includes: the first server generates a circularly ascending/descending digital code (e.g., selecting a next unused sequence number from a circularly ascending or descending number sequence), obtains a machine identification code corresponding to the first server (e.g., obtaining a server identifier (e.g., IP address) for the first server), and generates unique non-repeated ID according to the machine identification code and the digital code (e.g., by concatenating the circularly ascending/descending digital code generated for the data packet and the machine identification code corresponding to the first server). In some embodiments, a circularly ascending/descending digital code is a respective number which is distributed to each data packet that is to be sent out by the first server. For each current data packet waiting to be sent out, the first server uses the next number ascending (or descending depending on implementation) from the number corresponding to the UDP packet sent immediately preceding to the current data packet. For example, if the first server has 3 UDP packets to be sent, it distributes the number "1" to the first UDP packet to be sent, distributes the number "2" (that is incremented by "1" from the number "1") to the second UDP packet to be sent, and distributes the number "3" (that is incremented by "1" from the number "2") to the third UDP packet to be sent.

In some embodiments, the machine identification code may be a MAC address, an IP address, a machine name and the like which is the identification information to distinguish computer hardware devices (such as different first servers).

Figure 5:
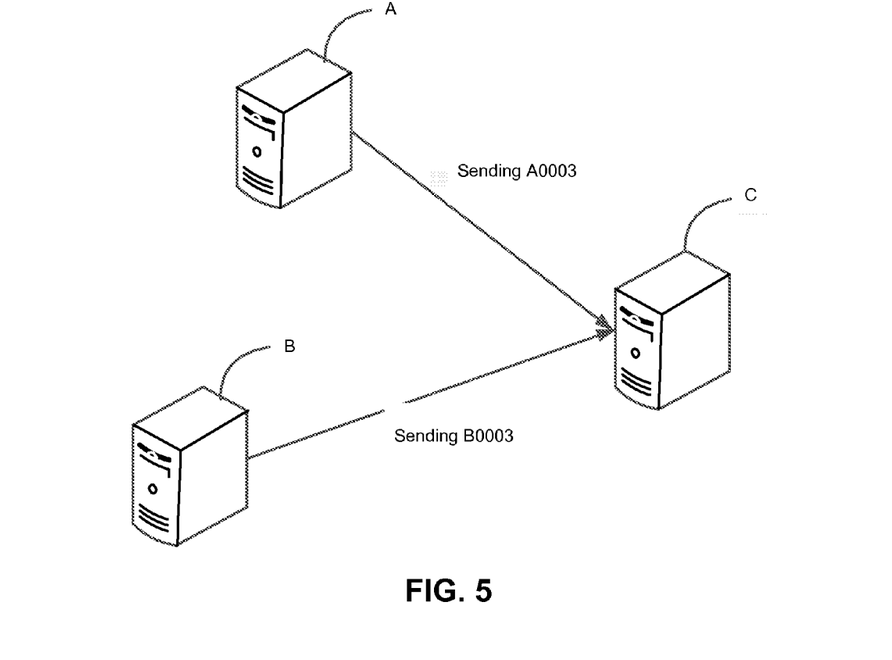
FIG. 5 is a schematic diagram illustrating a second server receiving augmented UDP packets from a plurality of first servers in accordance with some embodiments.

In some embodiments, the packet identifier may comprise two parts: the machine identification code and the above-mentioned digital code generated for the data packet. As shown in FIG. 5, when two first servers A and B each sends a respective augmented UDP packet to the second server C, the packet identifier in the respective augmented UDP packet sent by A is in the form of a server identifier "A" followed by a digital code generated for the data packet, wherein server identifier A is the machine identification code of the first server A. The packet identifier in the respective augmented UDP packet sent by B is in the form of a server identifier B followed by a digital code generated for the data packet, wherein the server identifier B is the machine identification code of the first server B. For example, in the case that a packet number "0003" of a certain augmented UDP packet with packet identifier "A0003" sent by server A is the same as the packet number of a certain augmented UDP packet with packet identifier "B0003" sent by server B, the second server C will not discard packet "B0003" after receiving packet "A0003" although the digital code of packet "B0003" is the same as that of packet "A0003", thereby ensuring the data accuracy of the second server when receiving UDP packets sent by a plurality of first servers. A digital code generated for the data packet is also referred to as a "packet number" when it needs to be distinguished from a packet identifier that includes both a machine identification code and the digital code generated for the data packet. If the packet identifier only includes the digital code generated for the data packet and not the machine identification code in some embodiments, then, the term "packet identifier" is used interchangeably with "packet number" or "the digital code generated for the data packet."

In some embodiments, the packet identifier includes a randomly generated code. When the random code has many bits (for example, 128 bits or 256 bits), the probability that the packet identifier including the randomly generated code is repeated is small, and the packet identifier including the randomly generated code can be considered as unique non-repeated.

In some embodiments, the digital code sequence from which a packet identifier (or the packet number portion of the packet identifier) can be selected has an initial value. The step of generating a unique non-repeated packet identifier by the first server further comprise: if the digital code for the immediately preceding data packet has been incremented/decremented to a preset maximum/minimum, the digital code for the current data packet will be reset to the initial value, and the digital codes for the succeeding data packets will again be circularly ascending/descending from the initial value.

That is, if the initial value is 1, the increment is 1, and the maximum is 100, when the packet number included in the packet identifier corresponding to the preceding UDP packet sent by the first server is 100, then the packet number in the packet identifier of the current UDP packet sent by the first server to be sent out next will be set to the initial value 1, and the packet numbers for subsequently sent data packets will be circularly ascending from 1. This process may be also called as sequence number reversal (e.g., the sequence number increments from the initial value one by one to the maximum value, reverses to the initial value, and increments from the initial value to the maximum value again).

In some embodiments, the packet identifier may be set in a 64-bit data segment, comprising two 32-bit sub-data segments which correspond to the machine identification code and the digital code generated for the data packet, respectively. When the digital code in the 32-bit sub data segment has 1 in all bits, it can be reset to 0 in all bits by incrementing the value in the sub-data segment by 1.

Figure 6:
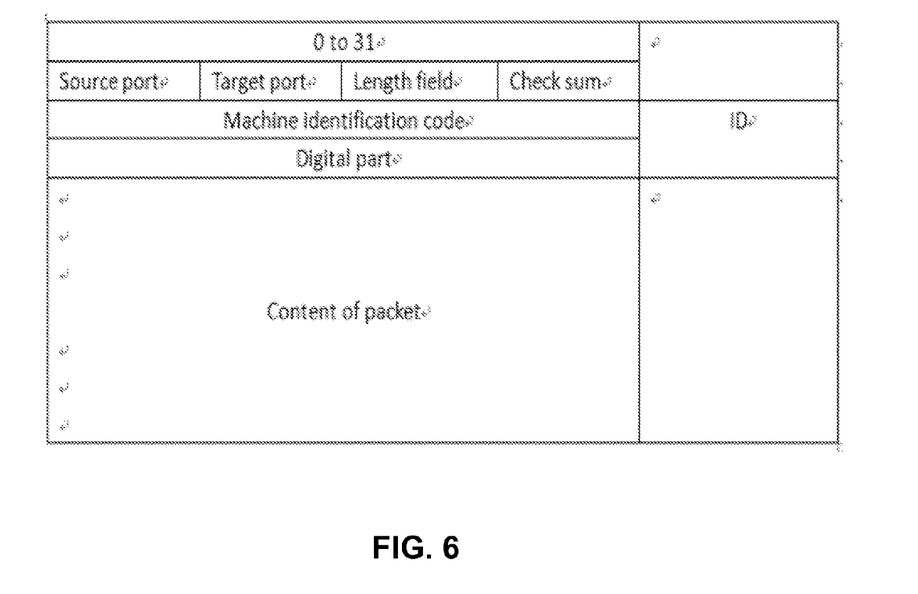
FIG. 6 is a schematic diagram of an exemplary data structure of a UDP packet in accordance with some embodiments.

For example, as shown in FIG. 6, the high 32-bit sub-data segment may corresponds to the machine identification code, and the low 32-bit sub-data segment may corresponds the packet number. By using the 32-bit sub-data segment to store the packet number part, the 32-bit sub-data segment can represent 4294967296 UDP packets in the current network. That means it is not possible to have a repeated UDP packet number until 4294967296 UDP packets are sent. Because the speed of processing UDP packets in the current network is actually smaller than 100 thousands/second, it is not possible to have a repeated packet identifier within at least 12 hours, thereby avoiding the appearance of the UDP packet with a repeated packet identifier (because the life period of UDP packet sent in the current network can be set to be far smaller than 12 hours).

As a result, the packet identifier will not be repeated due to the circularly ascending/descending number included in the packet identifier in the augmented UDP packet sent by the first server. The UDP packet obtained by the first server in the procedure of transmission only has the same packet identifier with its correspondent copy, and the packet identifier is different from the packet identifiers of all other UDP packets in transit or being processed in the network.

In some embodiments, the first server may generate multiple copies (e.g., more than 2 copies) of first augmented UDP packet, according to the network quality. If the network quality is good, only one copy may be generated in addition to the original copy of the first augmented data packet. If the network quality is poor, multiple copies may be generated in addition to the original copy of the first augmented data packet. In other words, the number of copies of the current UDP packet in which the packet identifier is added may be increased by the first server along with the deterioration of network quality.

Step S106: the second server receives the first augmented UDP packet, takes out the packet identifier from the first augmented UDP packet, and determines whether there is the packet identifier already in its cache; if so, the second server discards the received UDP packet; otherwise, the second server saves the packet identifier in the cache and determines successful reception of the UDP packet.

In some embodiments, the second server is provided with a cache. When receiving a respective packet identifier corresponding to a particular augmented UDP packet for the first time, the second server takes out the respective packet identifier from the body of the augmented UDP packet (without changing the content of the UDP packet originally obtained by the first server), allocates memory space for the packet identifier in the cache, and then saves the packet identifier in the memory space allocated for the packet identifier in the cache. After the UDP packet is determined as successfully received, the data of the UDP packet is extracted by the second server and is passed to the appropriate program in the application layer for processing or is forwarded to other network device by the second server.

If the second server receives another UDP packet with the same packet identifier (e.g., when the same packet identifier has already been saved in the cache due to an earlier received copy of the UDP packet), the later received UDP data packet will be discarded.

Furthermore, in some embodiments, the step of generating copies of an augmented UDP packet in which the packet identifier is added by the first server further comprises: the first server obtains a preset packet copy number, and generates a number of copies of the augmented UDP packet according to the preset packet copy number.

After the step of discarding the later received UDP packet by the second server, the second server obtains a receipt count corresponding to the packet identifier, obtains the preset packet copy number, and determines whether the receipt count corresponding to the packet number is equal to the packet copy number; if so, the second server removes the packet identifier from the cache.

For example, if the preset packet copy number is 2 (that means the first server will make two copies of the first augmented UDP packet in total, including one original copy generated by adding the packet number to the original UDP data packet received by the first server, and one duplicate copy), when receiving the first augment UDP packet, the second server can obtain the receipt count corresponding to the packet identifier by determining whether the same packet identifier has already been stored in the cache. If so, the receipt count is 2, otherwise, the receipt count is 1. When the receipt count and the packet copy number are both 2 (equal to each other), the packet identifier will be removed from the cache, so that the memory space corresponding to it will be recovered.

In another example, if the preset packet copy number is n (that means the first server will make n copies of the first augmented UDP packet in total, including one original copy and n−1 duplicate copies), for the packet identifier the second server may allocate, in the cache, a memory space for saving the receipt count corresponding to the packet identifier. Once receiving an augmented UDP packet corresponding to the packet identifier, the second server increases the receipt count by 1. When the receipt count reaches n, it means the n copies of augmented UDP packet sent by the first server are all received by the second server, and the second server may remove the packet identifier corresponding to the UDP packet from the cache and recover the corresponding memory space.

The second server removes packet identifiers stored in the cache according to the packet copy numbers and the receipt counts to save the memory space of the cache, thereby increasing the usage of the memory space. Furthermore, the packet numbers saved in the cache each has a respective life period. The second server will remove, from the cache, the packet identifier(s) whose life period(s) have expired. For an augmented UDP data packet having a respective packet identifier, if the second server received only one copy (or a number of copies less then above-mentioned packet copy number) of the augmented UDP data packet during the life period of the respective packet identifier (e.g., when other copies of the UDP data packet corresponding to the respective packet identifier are lost during transmission due to a network problem), the respective packet identifier will be saved in the cache until the respective packet identifier is cleared by the second server at the expiration of the packet identifier's lift period. The life period for a packet identifier can be preset to a fixed time, for example 10 minutes, when the second server first allocates a memory space for the packet identifier in the cache. When the life period of the packet identifier has expired, the second server removes the packet identifier from the cache and releases the corresponding memory space automatically, thereby saving the space of the cache and increasing the usage of the memory space.

Figure 4:
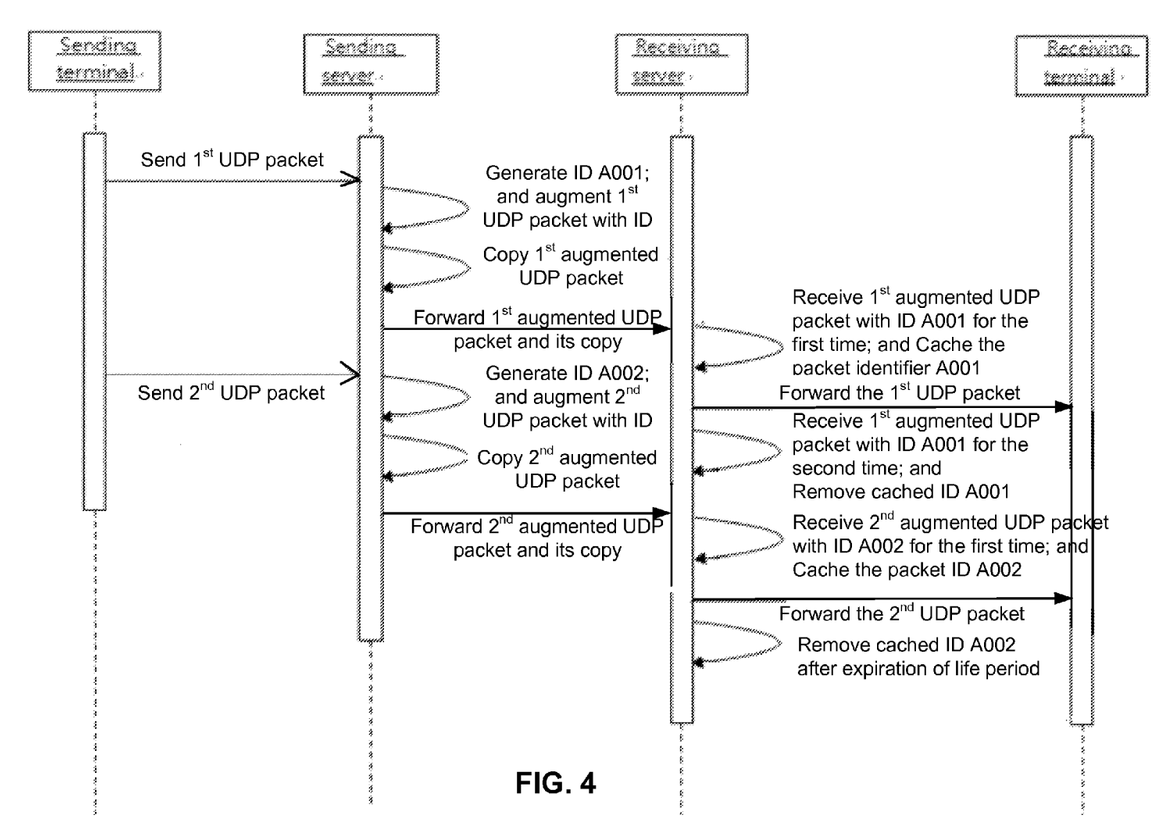
FIG. 4 is a timing sequence diagram of an interactive process performed by a system for transmitting data packets in accordance with some embodiments.

In some embodiments, the life period for a packet identifier may be set as a value which is greater than or equal to the maximum time delay of data transmission using the UDP protocol. In some embodiments, as shown in FIG. 2, the first server 10 and the second server 20 are all relay servers during data transmission, a sending terminal 30 is connected to the first server 10, and a receiving terminal 40 is connected to the second server 20. The step of obtaining a first UDP packet by the first server is: the first server receives the first UDP packet sent by the sending terminal 30. After the step of determining successful receipt of the first augmented UDP packet corresponding to the packet identifier, the second server forwards the first UDP packet restored from the augmented first UDP packet (e.g., by taking out the packet identifier from the first augmented UDP packet) to the receiving terminal 40. In some cases, the first server 10 and the sending terminal 30 may have a link with good network quality (namely a link with lower packet loss rate and minor network time delay) therebetween, or the first server 10 and the sending terminal 30 are in same subnet and the first server 10 is a gateway device. Similarly, the second server 20 and the receiving terminal 40 may have a link with good network quality (namely a link with lower packet loss rate and minor network time delay) therebetween, or the second server 20 and the receiving terminal 40 are in same subnet and the second server 20 is a gateway device. The UDP packet sent by the sending terminal 30 to the receiving terminal 40 arrives at the first server 10 first. The first server adds a generated unique non-repeated packet identifier in the UDP packet to generate the first augmented UDP packet, makes multiple copies of it, and sends them to the second server 20. The second server 20 only needs to successfully receive one of the multiple copies of the augmented UDP packets with the packet identifier. After that, the second server 20 forwards the UDP packet in which the packet identifier has been removed to the receiving terminal 40 through a link with good network quality. Comparing to the network environment of conventional technique in which there are no first server 10 and second server 20 between sending terminal 30 and receiving terminal 40, the probability of packet loss is decreased (if the loss probability in transmission of one data packet is 40%, the loss probability in transmission of two data packets is the square of 40%, namely 16%). In actual applications, exemplary interactive procedure between the sending terminal, the first server, the second server, and the receiving terminals are shown in FIG. 4.

In some embodiments, before the step of generating copies of augmented UDP packet in which the respective packet identifier is added, the following steps are performed:

The first server adds a time stamp of generation. After the step of receiving the augmented UDP packet by the second server, the following steps are performed:

The second server obtains the time stamp of generation of the augmented UDP packet that has been received, generates a response packet including the time stamp of generation and returns the response packet to the first server.

The first server receives returned response packet, extracts the time stamp of generation included in it, calculates the network time delay based on the time stamp of generation, and calculates the packet loss rate bases on the number of returned response packet received.

For example, the first server may periodically add time stamps of generation in the augmented UDP packets it send out. After receiving an augmented UDP packet in which a time stamp of generation is added, the second server generates a copy of it (the copy is the response packet), and then return the copy to the first server. After the first server receives returned UDP packet, the network time delay between first server and second server can be calculated through subtracting the time stamp of receipt of the returned UDP packet by the time stamp of generation and dividing the result by 2. In some embodiments, after receiving an augmented UDP packet including a time stamp of generation, the second server generates a UDP packet including only the time stamp of generation as a response packet and returns it to the first server.

In some embodiments, the first server may add a respective time stamp of generation in multiple (e.g., M) augmented UDP packets, if the first server only receives S UDP packets have the same time stamp returned by the second server, the packet loss rate is (M−S)/M. In some embodiments, the first server may also calculate the network time delay and the packet loss rate through sending independent detection packets.

In some embodiments, the step of generating copies of the first augmented UDP packet further includes: the first server sets the preset packet copy number based on the network time delay and/or the packet loss rate. If the network time delay is low and/or the packet loss rate is low, that means the network quality between first server and second server is good, the first server may set a smaller packet copy number, e.g., 2 copies total, when generating copies of first augmented UDP packet. If the network time delay is high and/or the packet loss rate is high, that means the network quality between first server and second server is poor, the first server may set a larger packet copy number, for example 3 copies total, when generating copies of the first augmented UDP packet.

In some embodiments, when the network quality is sufficiently good, the first sever may choose to send only a single copy of the augmented UDP packet to the second server with no accompanying duplicate copy or copies. When sending only the single copy of the augmented UDP packet, the packet identifier in the augmented UDP packet needs to be distinguishable from other augmented UDP packets that are sent with duplicates, but need not be distinguishable from other augmented UDP packets that are also not sent with any duplicates. This is because the second server does not need to cache the packet identifiers of the augmented UDP packets that were not sent with any duplicates.

In some embodiments, before the step of generating the unique non-repeated packet identifier, the following step is performed: the first server determines whether it is proper to send only a single copy of the augmented data packet based on the current network time delay and/or the current packet loss rate; if it is appropriate to send only a single copy of the augmented data packet, the second server obtains a preset fixed repeatable identifier (e.g., 0), and generates an augmented UDP packet by adding the repeatable identifier into the UDP packet, and sends the augmented UDP packet to the second server; Otherwise, the second server performs the step of generating the unique non-repeated packet identifier for the data packet and generates an augmented UDP packet by adding the unique non-repeated identifier into the UDP packet, and sends the augmented UDP packet to the second server. In other words, there are two classes of augmented UDP packets, namely, the first class including augmented UDP packets with unique non-repeated identifiers (e.g., the digital code generated based on a circular number sequence or a randomly generated digital code), and the second class including augmented UDP packets with a repeatable identifier (e.g., "0").

In some embodiments, after the step of taking out the packet identifier from a received augmented UDP packet, the second server also determines whether the packet identifier taken out of the UDP packet is the preset repeatable packet identifier, if not, the second server performs the step of determining whether the same packet identifier is already stored in the cache.

In above example, if the fixed repeatable packet identifier is a packet identifier whose digital code is 0, the first server does not generate the first class augmented UDP packet, but generate the second class augmented UDP packet by adding the packet identifier with the digital code 0 into the UDP packet when the network time delay is low and the packet loss rate is low (i.e. the network quality is good); otherwise, the first server still generates the first class UDP packet and copies thereof when the network quality is poor. In the second server, if the digital code in the packet identifier taken out from received augmented UDP packet is detected as 0 (i.e. the packet identifier is a fixed repeatable identifier), the UDP packet is determined to be a second class UDP packet. The second server thus determines that this second class UDP packet was sent as a single copy with no accompanying duplicates, so the packet identifier is not cached by the second server.

In other words, when the network quality is good, the first server may generate second class UDP packets for which it is not necessary to generate any duplicate copy, thereby improving the usage of network band width.

In some embodiments, after the step of taking out the packet identifier from received augmented UDP packet, the second server determines that the reception of the UDP packet is successful, if the extraction of the packet identifier from the UDP packet has failed. For example, the first server may also insert 64-bit protocol identification information in the body of the original UDP packet, and insert the packet identifier at the end of the protocol identification information. If the 64-bit data segment extracted from the start of the body of received UDP packet does not agree with the protocol identification information, it is determined that the extraction has failed, which means the UDP packet is a regular UDP packet sent from other network devices (for example, sending terminal 30 in FIG. 2); and then it may be determined that the receipt of the data packet is successful, that means the step of subsequently taking out the packet identifier is not needed. Therefore, the second server can receive not only augmented UDP packets sent by the first server but also UDP packets sent by other network devices.

In some embodiments, as shown in FIG. 2, a system for transmitting data packet comprises the first server 10 and the second server 20.

The first server 10 is used to obtain a first UDP packet (e.g., from the sending terminal 30) and generate a unique non-repeated packet identifier for the first UDP packet. The first server generates a first class augmented UDP packet by adding the unique non-repeated packet identifier into the original first UDP packet, generates one or more copies of the first class augmented UDP packet, and send the first class UDP packet and duplicate copies thereof to the second server 20.

The second server 20 is used to receive the first class augmented UDP packet, take out the packet identifier from it, and determines whether there is already the same packet identifier stored in the cache; if so, the second server discards the received augmented UDP packet; otherwise, the second server saves the extracted packet identifier in the cache, and determine that the receipt of the first UDP packet is successful.

In some embodiments, as shown in FIG. 2, the system for transmitting data packets further comprises a sending terminal 30 and a receiving terminal 40.

The first server 10 is also used to receive the first UDP packet sent by the sending terminal 30.

The second server 20 is also used to forward the first UDP packet, which is determined as successfully received and from which the packet identifier has been taken out, to the receiving terminal 40.

In some embodiments, the first server 10 is also used to obtain a preset packet copy number, and generate duplicate copies of first class augmented UDP packet according to the preset packet copy number.

The second server 20 is also used to obtain a receipt count corresponding to a packet identifier, obtains the preset packet copy number, and determines whether the receipt count corresponding to the packet identifier is greater than or equal to the packet copy number; if so, remove the packet identifier from the cache.

In some embodiments, the packet identifier saved in the cache has a preset life period. The second server is also used to remove, from the cache, the packet identifier of which the life period has expired. In some embodiments, the first server is also used to generate a circularly ascending/descending digital code, obtain a machine identification code corresponding to the first server, and generates a unique non-repeated packet identifier based on the machine identification code and the digital code.

In some embodiments, the digital code is selected from an ascending/descending number sequence that has an initial value and a maximum/minimum value.

In some embodiments, the first server 10 is also used to set the digital code for a current data packet to the initial value when the digital code obtained from the number sequence for the immediately preceding data packet has been incremented/decremented to a preset maximum/minimum of the number sequence, and the digital code is again circularly incremented/decremented from the initial value for subsequent data packets.

In some embodiments, the packet identifier is a 64-bit data segment, comprising two 32-bit sub-data segments which correspond to the machine identification code and the digital code, respectively.

In some embodiments, the first server 10 is also used to add a time stamp of generation in the augmented UDP packet. The second server 20 is also used to obtain the time stamp of generation of the received augmented UDP packet, generate a response packet including the time stamp of generation and return it to the first server.

In some embodiments, the first server 10 is also used to receive the returned response packet, extract the time stamp of generation included in it, calculate the network time delay based on the time stamp of generation, and calculates the packet loss rate bases on the number of returned UDP packets received.

In some embodiments, the first server 10 is also used to determine the packet copy number based on the network time delay and/or the packet loss rate.

In some embodiments, the first server is also used to determine whether it is proper to send a single copy of the augmented data packet without duplicate(s) based on the network time delay and/or the packet loss rate; if it is determined to be appropriate to send only a single copy of the augmented data packet, the first server obtains a preset fixed repeatable packet identifier, generates a second class augmented UDP packet by adding the preset repeatable packet identifier into the UDP packet, and sends the second class augmented UDP packet to the second server; otherwise, the first server generates a unique non-repeated packet identifier for the data packet and generates a first class augmented UDP packet by adding the unique non-repeated packet identifier into the UDP packet.

In some embodiments, after the step of taking out the packet identifier from received augmented UDP packet by the second server 20, the second server 20 is also used to determine whether the packet identifier taken out from received augmented UDP packet is the preset fixed repeatable packet identifier, if not, the second server 20 determines whether there is already the same packet identifier stored in the cache.

Figure 7:
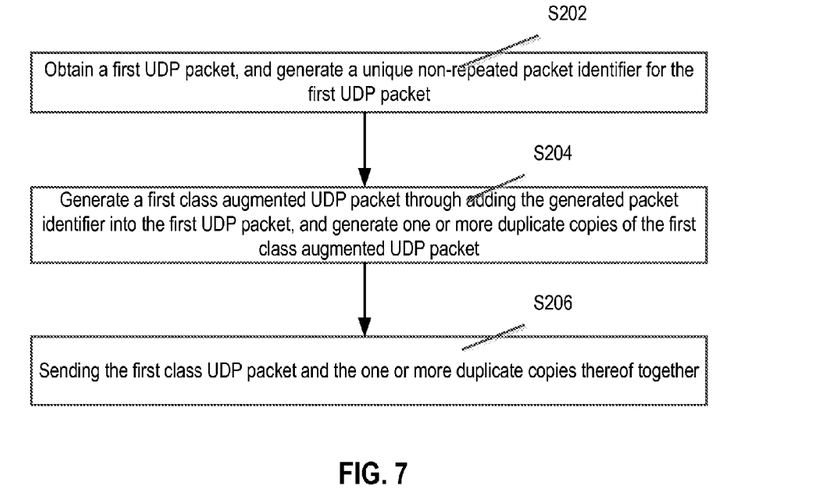
FIG. 7 is a flow chart of a method for sending data packets in accordance with some embodiments.

In some embodiments, as shown in FIG. 7, a method for sending data packets can be executed on a first server, e.g., a server implemented a computer system of Von Neumann architecture by means of a computer program. The method comprises the following steps.

Step S202: the first server obtains a first UDP packet, and generates a unique non-repeated packet identifier for the first UDP packet.

Step S204: the first server generates a first class augmented UDP packet by adding the generated packet identifier into the UDP packet, and generates one or more duplicate copies of the first class augmented UDP packet.

Step S206: the first server sends the first class augmented UDP packet and the duplicate copy or copies thereof together.

Figure 8:
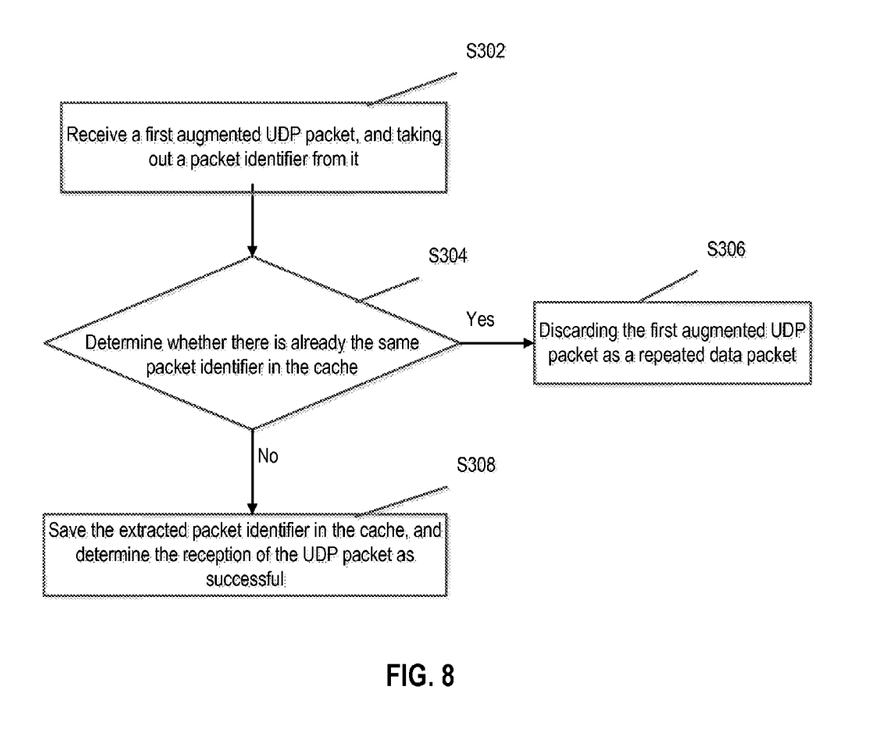
FIG. 8 is a flow chart of a method for receiving data packets in accordance with some embodiments.

In one embodiment, as shown in FIG. 8, a method for receiving data packets may be executed on a second server, e.g., a computer system of Von Neumann architecture by means of a computer program. The method comprises the following steps.

Step S302: the second server receives a first augmented UDP packet, and takes out a packet identifier from it.

Step S304: the second server determines whether there is already the packet identifier stored in the cache, if so, the second server performs step S306; otherwise, performs step S308.

Step S306: the second server discards the first augmented UDP packet as a repeated data packet;

Step S308: the second server saves the extracted packet identifier in the cache, and determines the reception of the UDP packet as successful.

In some embodiments, after the step of discarding the received augmented UDP packet, the second server obtains receipt count corresponding to the packet identifier; obtains a preset packet copy number; and determines whether the receipt count corresponding to the packet number is greater than or equal to packet copy number, if yes, the second server removes the packet identifier from the cache.

In some embodiments, the packet identifier saved in the cache has a life period. The method further comprises a step of removing, from the cache, the packet identifier whose life period has expired.

Figure 9:
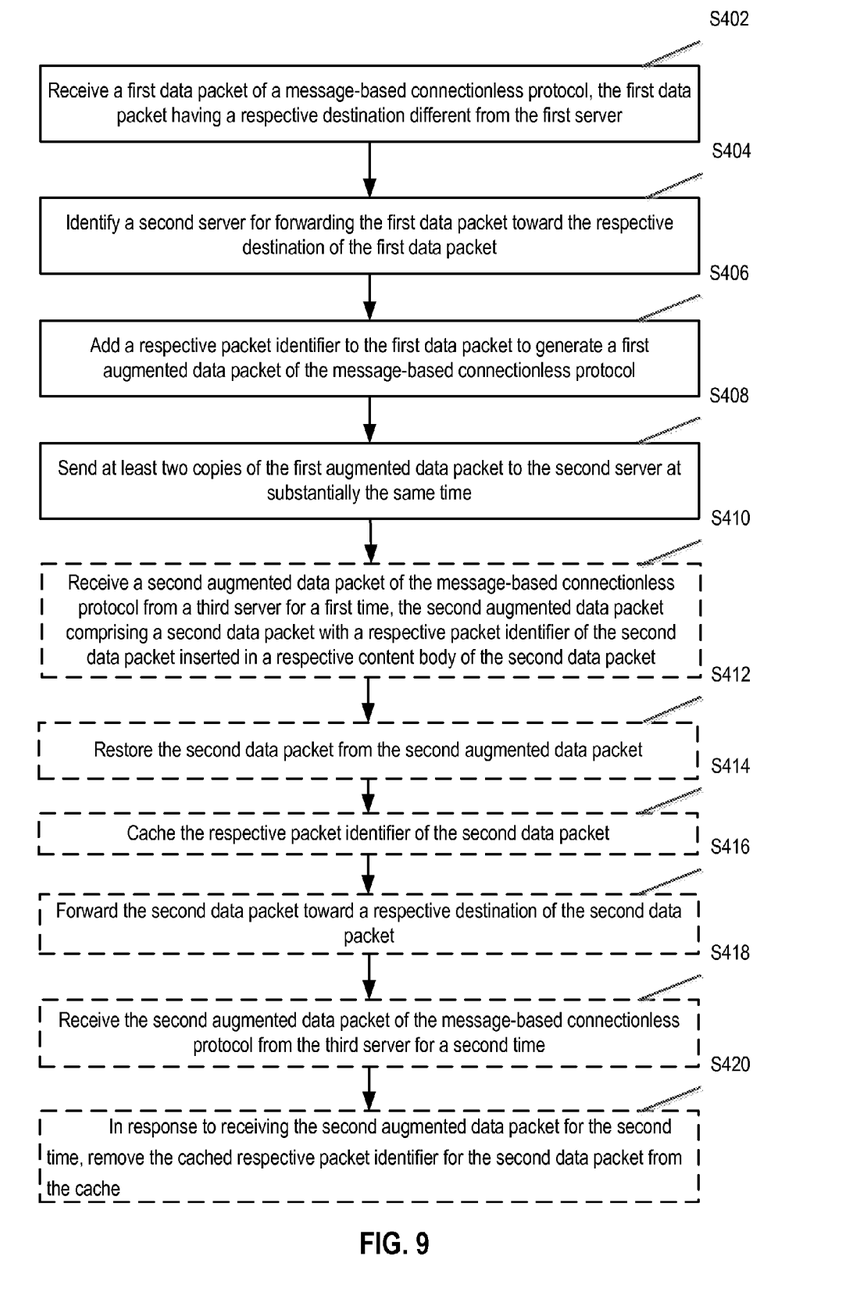
FIG. 9 is a flow chat of a method for transmitting data packets in accordance with some embodiments.

FIG. 9 is a flow chat of an exemplary method of transmitting data packets in a network in accordance with some embodiments. The method is performed by a first server that serves as a sending server for a second server, and optionally, as a receiving server for a third server.

In some embodiments, first server receives (S402) a first data packet of a message-based connectionless protocol (e.g., a UDP packet), the first data packet having a respective destination different from the first server. The first server identifies (S404) a second server for forwarding the first data packet toward the respective destination of the first data packet. The first server adds (S406) a respective packet identifier to the first data packet to generate a first augmented data packet of the message-based connectionless protocol. The first server sends (S408) at least two copies of the first augmented data packet to the second server at substantially the same time. In some embodiments, the second server receives at least one of the two copies of the first augmented data packet, restores the first data packet from the received copy of the first augmented data packet, and forwards the first data packet toward the respective destination of the first data packet.

In some embodiments, to add a respective packet identifier to the first data packet to generate a first augmented data packet of the message-based connectionless protocol, the first server selects a next unused sequence number from a circular number sequence as the respective packet identifier for the first data packet, and inserts the respective packet identifier selected for the first data packet into a respective content body of the first data packet to generate the first augmented data packet of the message-based connectionless protocol.

In some embodiments, to add a respective packet identifier to the first data packet to generate a first augmented data packet of the message-based connectionless protocol, the first server selects a next unused sequence number from a circular number sequence, concatenates the next unused sequence number and a respective server identifier of the first server to obtain the respective packet identifier for the first data packet; and inserts the respective packet identifier obtained for the first data packet into a respective content body of the first data packet to generate the first augmented data packet of the message-based connectionless protocol.

In some embodiments, the first server receives (S410) a second augmented data packet of the message-based connectionless protocol from a third server for a first time, the second augmented data packet comprising a second data packet with a respective packet identifier of the second data packet inserted in a respective content body of the second data packet. The first server restores (S412) the second data packet from the second augmented data packet. The first server caches (S414) the respective packet identifier of the second data packet, and forwards (S416) the second data packet toward a respective destination of the second data packet. In some embodiments, the first server receives (S418) the second augmented data packet of the message-based connectionless protocol from the third server for a second time. In response to receiving the second augmented data packet for the second time, the first server removes (S420) the cached respective packet identifier for the second data packet from the cache, and discards the second augmented data packet.

In some embodiments, the first server determines whether a currently received augmented data packet is a duplicate data packet of a previously received augmented data packet based on whether a respective packet identifier contained in the currently received augmented data packet has been cached at the first server.

In some embodiments, the first server removes the cached respective packet identifier of the second data packet from the cache if the second augmented data packet is not received before expiration of a predetermined life period for the respective packet identifier of the second data packet.

Other details of the method are disclosed with respect to FIGS. 1-8 and accompanying descriptions. Not all steps shown in FIG. 9 are required for all embodiments.

Figure 10:
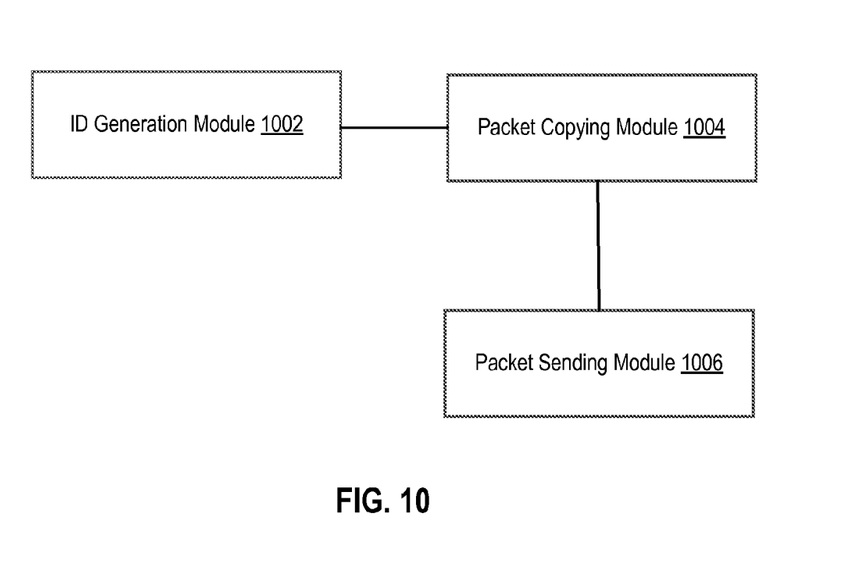
FIG. 10 is a structure block diagram of an apparatus for sending data packets in accordance with some embodiments.

In some embodiments, as shown in FIG. 10, an apparatus for sending data packets comprises an ID generation module 1002, a packet copying module 1004 and data packet sending module 1006. In some embodiments, the ID generation module 1002 is used to obtain a UDP packet, and generate a unique non-repeated packet identifier for the UDP packet. The packet copying module 1004 is used to generate a first class augmented UDP packet by adding the unique non-repeated packet identifier in the UDP packet, and generate one or more duplicate copies of the first class augmented UDP packet. The packet sending module 1006 is used to send the first class augmented UDP packet and the one or more duplicate copies thereof together.

Figure 11:
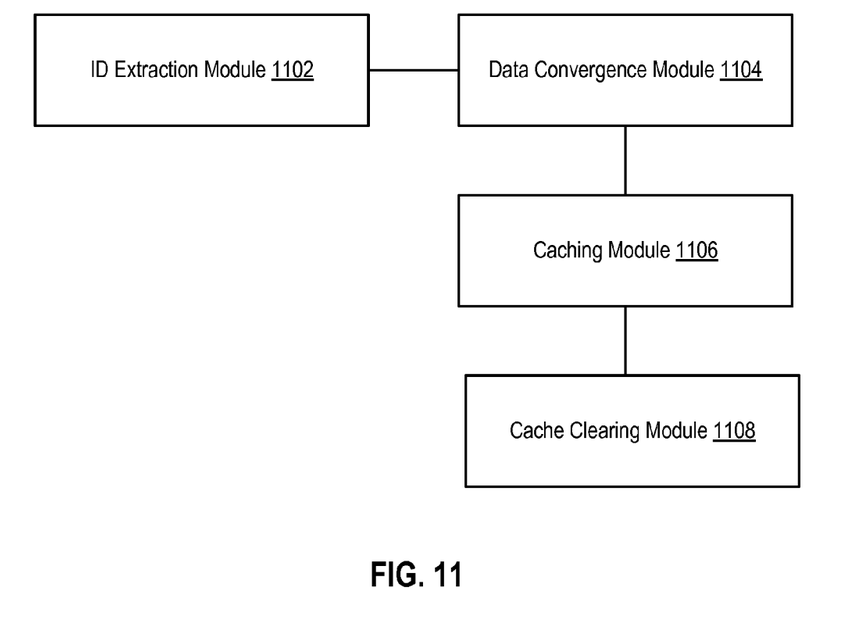
FIG. 11 is a structure block diagram of an apparatus for receiving data packets in accordance with some embodiments.

In some embodiments, as shown in FIG. 11, an apparatus for receiving data packets comprises an ID extraction module 1102, a data convergence module 1004, a caching module 1106, and a cache clearing module 1108.

In some embodiments, the ID extraction module 1102 is used to receive an augmented UDP packet and take out the packet identifier from it. The data convergence module 204 is used to determine whether there is already the same packet identifier saved in the cache, if so, discards the received UDP packet; otherwise, to notify the caching module 1106 to save the extracted packet identifier in the cache, and determines the receipt of the UDP packet as being successful.

In some embodiments, the data convergence module 204 is also used to obtain a receipt count corresponding to the packet identifier, to obtain a preset packet copy number, and to determine whether the receipt count corresponding to the packet identifier is greater than or equal to the packet copy number, and if so, to notify the cache clearing module 1108 to remove the packet identifier from the cache.

In some embodiments, the packet identifier saved in the cache has a life period. the cache cleaning module 1108 is also used to remove, in the cache, the packet identifier whose life period has expired.

Figure 12:
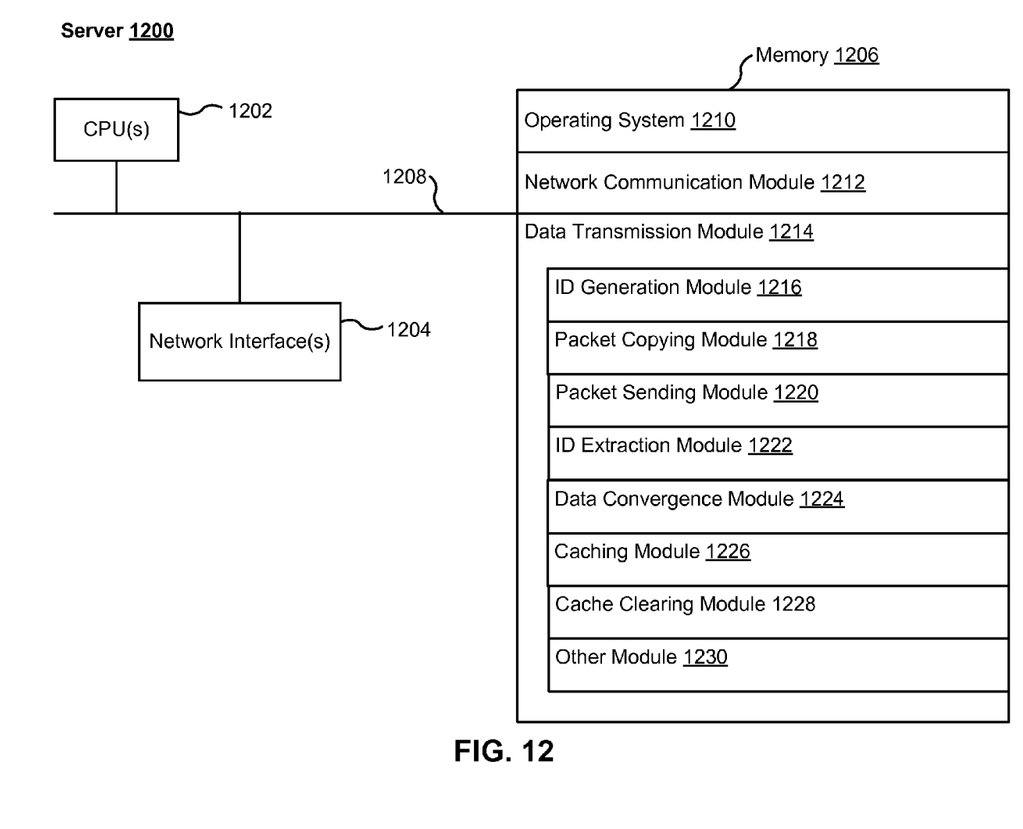
FIG. 12 is a structure block diagram of a server which performs above-mentioned methods for sending data packets and/or receiving data packets.

FIG. 12 is a block diagram illustrating a server system 1200 in accordance with some embodiments. The server system 1200 can be used to implement the methods described above. The server system 1200, typically, includes one or more processing units (CPUs) 1202, one or more network interfaces 1204, memory 1206, and one or more communication buses 1208 for interconnecting these components (sometimes called a chipset). Memory 1206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1206, optionally, includes one or more storage devices remotely located from the CPU(s) 1202. Memory 1206, or alternately the non-volatile memory device(s) within memory 1206, includes a non-transitory computer readable storage medium. In some implementations, memory 1206, or the non-transitory computer readable storage medium of memory 1206, stores the following programs, modules, and data structures, or a subset or superset hereof:

- an operating system 1210 including procedures for handling various basic system services and for performing hardware dependent tasks;
- a network communication module 1212 that is used for connecting the interface server 1200 to other computing devices (e.g., a terminal device, a sending server or a receiving server) connected to one or more networks via one or more network interfaces 1204 (wired or wireless);
- a data transmission module 1214 for enabling the server system 1200 to serve the data transmission needs of terminal devices, including but not limited to:
  - an ID generation module 1216, configured to obtain a UDP packet, and generate a unique non-repeated packet identifier for the UDP packet;
  - a packet copying module 1218, configured to generate a first class augmented UDP packet by adding the unique non-repeated packet identifier in the UDP packet, and generate one or more duplicate copies of the first class augmented UDP packet;
  - a packet sending module 1220, configured to send the first class augmented UDP packet and the one or more duplicate copies thereof together;
  - an ID extraction module 1222, configured to receive an augmented UDP packet and take out the packet identifier from it;
  - a data convergence module 1224, configured to determine whether there is already the same packet identifier saved in the cache, if so, discards the received UDP packet; otherwise, to notify the caching module 1106 to save the extracted packet identifier in the cache, and determines the receipt of the UDP packet as being successful; and in some embodiments, the data convergence module 204 is also used to obtain a receipt count corresponding to the packet identifier, to obtain a preset packet copy number, and to determine whether the receipt count corresponding to the packet identifier is greater than or equal to the packet copy number, and if so, to notify the cache clearing module 1108 to remove the packet identifier from the cache;
  - a caching module 1226, configured to save the extracted packet identifier in the cache when the augmented UDP packet is received for the first time;
  - a cache clearing module 1228, configured to remove the packet identifier from the cache when the life period of the packet identifier has expired.
  - other modules 1230 for performing other functions of the servers as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1206, optionally, stores a subset of the modules and data structures identified above. Furthermore, memory 1206, optionally, stores additional modules and data structures not described above.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of transmitting data packets across a network, comprising:

at a first server having one or more processors and memory:

receiving a first data packet of a message-based connectionless protocol, the first data packet having a respective destination different from the first server;

identifying a second server for forwarding the first data packet toward the respective destination of the first data packet;

adding a respective packet identifier to the first data packet to generate a first augmented data packet of the message-based connectionless protocol;

sending at least two copies of the first augmented data packet to the second server within a predetermined life period for the respective packet identifier of the first data packet; wherein the predetermined life period for the respective packet identifier of the first data packet is an amount of time that the respective packet identifier of the first data packet is configured to be cached at the second server;

receiving a second augmented data packet of the message-based connectionless protocol from a third server for a first time, the second augmented data packet comprising a second data packet with a respective packet identifier of the second data packet inserted in a respective content body of the second data packet;

restoring the second data packet from the second augmented data packet;

caching the respective packet identifier of the second data packet;

forwarding the second data packet toward a respective destination of the second data packet; and removing the cached respective packet identifier of the second data packet if the second augmented data packet is not received before expiration of a predetermined life period for the respective packet identifier of the second data packet.

2. The method of claim 1, wherein the second server receives at least one of the two copies of the first augmented data packet, restores the first data packet from the received copy of the first augmented data packet, and forwards the first data packet toward the respective destination of the first data packet.

3. The method of claim 1, wherein adding a respective packet identifier to the first data packet to generate a first augmented data packet of the message-based connectionless protocol further comprises:

selecting a next unused sequence number from a circular number sequence as the respective packet identifier for the first data packet; and inserting the respective packet identifier selected for the first data packet into a respective content body of the first data packet to generate the first augmented data packet of the message-based connectionless protocol.

4. The method of claim 1, wherein adding a respective packet identifier to the first data packet to generate a first augmented data packet of the message-based connectionless protocol further comprises:

selecting a next unused sequence number from a circular number sequence;

concatenating the next unused sequence number and a respective server identifier of the first server to obtain the respective packet identifier for the first data packet; and inserting the respective packet identifier obtained for the first data packet into a respective content body of the first data packet to generate the first augmented data packet of the message-based connectionless protocol.

5. The method of claim 1, further comprising:

receiving the second augmented data packet of the message-based connectionless protocol from the third server for a second time;

in response to receiving the second augmented data packet for the second time,
removing the cached respective packet identifier for the second data packet; and
discarding the second augmented data packet.

6. The method of claim 1, further comprising:

determining whether a currently received augmented data packet is a duplicate data packet of a previously received augmented data packet based on whether a respective packet identifier contained in the currently received augmented data packet has been cached at the first server.

7. A first server for transmitting data packets across a network, comprising:

one or more processors; and memory having instructions stored thereon, the instructions, when executed by the processors, cause the processors to perform operations comprising:

receiving a first data packet of a message-based connectionless protocol, the first data packet having a respective destination different from the first server;

identifying a second server for forwarding the first data packet toward the respective destination of the first data packet;

adding a respective packet identifier to the first data packet to generate a first augmented data packet of the message-based connectionless protocol;

sending at least two copies of the first augmented data packet to the second server within a predetermined life period for the respective packet identifier of the first data packet; wherein the predetermined life period for the respective packet identifier of the first data packet is an amount of time that the respective packet identifier of the first data packet is configured to be cached at the second server;

receiving a second augmented data packet of the message-based connectionless protocol from a third server for a first time, the second augmented data packet comprising a second data packet with a respective packet identifier of the second data packet inserted in a respective content body of the second data packet;

restoring the second data packet from the second augmented data packet;

caching the respective packet identifier of the second data packet;

forwarding the second data packet toward a respective destination of the second data packet; and removing the cached respective packet identifier of the second data packet if the second augmented data packet is not received before expiration of a predetermined life period for the respective packet identifier of the second data packet.

8. The first server of claim 7, wherein the second server receives at least one of the two copies of the first augmented data packet, restores the first data packet from the received copy of the first augmented data packet, and forwards the first data packet toward the respective destination of the first data packet.

9. The first server of claim 7, wherein adding a respective packet identifier to the first data packet to generate a first augmented data packet of the message-based connectionless protocol further comprises:

selecting a next unused sequence number from a circular number sequence as the respective packet identifier for the first data packet; and inserting the respective packet identifier selected for the first data packet into a respective content body of the first data packet to generate the first augmented data packet of the message-based connectionless protocol.

10. The first server of claim 7, wherein adding a respective packet identifier to the first data packet to generate a first augmented data packet of the message-based connectionless protocol further comprises:

selecting a next unused sequence number from a circular number sequence;

concatenating the next unused sequence number and a respective server identifier of the first server to obtain the respective packet identifier for the first data packet; and inserting the respective packet identifier obtained for the first data packet into a respective content body of the first data packet to generate the first augmented data packet of the message-based connectionless protocol.

11. The first server of claim 7, wherein the operations further comprise:

receiving the second augmented data packet of the message-based connectionless protocol from the third server for a second time;

in response to receiving the second augmented data packet for the second time, removing the cached respective packet identifier for the second data packet; and discarding the second augmented data packet.

12. The first server of claim 7, wherein the operations further comprise:

determining whether a currently received augmented data packet is a duplicate data packet of a previously received augmented data packet based on whether a respective packet identifier contained in the currently received augmented data packet has been cached at the first server.

13. A non-transitory computer-readable medium having instructions stored thereon, the instructions, when executed by one or more processors, cause the processors to perform operations comprising:

at a first server:

receiving a first data packet of a message-based connectionless protocol, the first data packet having a respective destination different from the first server;

identifying a second server for forwarding the first data packet toward the respective destination of the first data packet;

adding a respective packet identifier to the first data packet to generate a first augmented data packet of the message-based connectionless protocol;

sending at least two copies of the first augmented data packet to the second server within a predetermined life period for the respective packet identifier of the first data packet; wherein the predetermined life period for the respective packet identifier of the first data packet is an amount of time that the respective packet identifier of the first data packet is configured to be cached at the second server;

receiving a second augmented data packet of the message-based connectionless protocol from a third server for a first time, the second augmented data packet comprising a second data packet with a respective packet identifier of the second data packet inserted in a respective content body of the second data packet;

restoring the second data packet from the second augmented data packet;

caching the respective packet identifier of the second data packet;

forwarding the second data packet toward a respective destination of the second data packet; and removing the cached respective packet identifier of the second data packet if the second augmented data packet is not received before expiration of a predetermined life period for the respective packet identifier of the second data packet.

14. The computer-readable medium of claim 13, wherein the second server receives at least one of the two copies of the first augmented data packet, restores the first data packet from the received copy of the first augmented data packet, and forwards the first data packet toward the respective destination of the first data packet.

15. The computer-readable medium of claim 13, wherein adding a respective packet identifier to the first data packet to generate a first augmented data packet of the message-based connectionless protocol further comprises:

selecting a next unused sequence number from a circular number sequence as the respective packet identifier for the first data packet; and inserting the respective packet identifier selected for the first data packet into a respective content body of the first data packet to generate the first augmented data packet of the message-based connectionless protocol.

16. The computer-readable medium of claim 13, wherein adding a respective packet identifier to the first data packet to generate a first augmented data packet of the message-based connectionless protocol further comprises:

selecting a next unused sequence number from a circular number sequence;

concatenating the next unused sequence number and a respective server identifier of the first server to obtain the respective packet identifier for the first data packet; and inserting the respective packet identifier obtained for the first data packet into a respective content body of the first data packet to generate the first augmented data packet of the message-based connectionless protocol.

17. The computer-readable medium of claim 13, wherein the operations further comprise:

receiving the second augmented data packet of the message-based connectionless protocol from the third server for a second time;

in response to receiving the second augmented data packet for the second time, removing the cached respective packet identifier for the second data packet; and discarding the second augmented data packet.

18. The computer-readable medium of claim 13, wherein the operations further comprise:

determining whether a currently received augmented data packet is a duplicate data packet of a previously received augmented data packet based on whether a respective packet identifier contained in the currently received augmented data packet has been cached at the first server.

* * * * *